(12) United States Patent
Griffin et al.

(10) Patent No.: US 12,519,618 B2
(45) Date of Patent: Jan. 6, 2026

(54) DERIVED UNIQUE KEY PER RAINDROP (DUKPR)

(71) Applicant: Wells Fargo Bank, N.A., San Francisco, CA (US)

(72) Inventors: Phillip H. Griffin, Raleigh, NC (US); Jeffrey J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 290 days.

(21) Appl. No.: 18/141,977

(22) Filed: May 1, 2023

(65) Prior Publication Data

US 2023/0275746 A1 Aug. 31, 2023

Related U.S. Application Data

(60) Division of application No. 16/892,881, filed on Jun. 4, 2020, now Pat. No. 11,843,690, which is a continuation of application No. 15/913,028, filed on Mar. 6, 2018, now Pat. No. 10,764,036.

(51) Int. Cl.
*H04L 9/08* (2006.01)
*H04L 9/32* (2006.01)
*H04L 9/40* (2022.01)
*H04L 9/06* (2006.01)

(52) U.S. Cl.
CPC .......... *H04L 9/0819* (2013.01); *H04L 9/0838* (2013.01); *H04L 9/0861* (2013.01); *H04L 9/3247* (2013.01); *H04L 63/06* (2013.01); *H04L 9/0643* (2013.01)

(58) Field of Classification Search
CPC ... H04L 9/0838; H04L 9/0894; H04L 9/0861; H04L 9/0819; H04L 9/3247; H04L 9/0643; H04L 63/06; H04L 63/0643
USPC ........................................................ 380/277
See application file for complete search history.

(56) References Cited

U.S. PATENT DOCUMENTS

| | | | |
|---|---|---|---|
| 7,353,388 B1 | 4/2008 | Gilman et al. | |
| 8,005,227 B1 | 8/2011 | Linnell et al. | |
| 8,295,492 B2 | 10/2012 | Suarez et al. | |
| 8,621,240 B1 | 12/2013 | Auchmoody et al. | |
| 8,806,194 B2 | 8/2014 | Kim et al. | |
| 8,898,482 B2 | 11/2014 | Templin et al. | |
| 10,666,436 B2* | 5/2020 | Roth | H04L 9/3247 |
| 2005/0114694 A1 | 5/2005 | Wager et al. | |
| 2007/0192614 A1 | 8/2007 | Bakke | |
| 2009/0279699 A1 | 11/2009 | Noda | |

(Continued)

OTHER PUBLICATIONS

NPL Search Terms (Year: 2025).*
NPL Search Terms (Year: 2023).

*Primary Examiner* — Syed A Zaidi
(74) *Attorney, Agent, or Firm* — Foley & Lardner LLP (57) ABSTRACT

A method for a key management server to manage encryption for data stored by a cloud provider server includes receiving, by the key management server from the cloud provider server, a request for a drop key. The request includes a hash drop identifier that uniquely identifies a cipher drop, and the cipher drop comprises a unit of data stored by the cloud provider server. The method further includes generating the drop key based on at least the hash drop and the drop identifier and encrypting the drop key. A response comprising the encrypted drop key is sent to the cloud provider server.

18 Claims, 6 Drawing Sheets

(56) References Cited

U.S. PATENT DOCUMENTS

| | | |
|---|---|---|
| 2009/0296926 A1 | 12/2009 | Perlman |
| 2009/0296942 A1 | 12/2009 | Burckart et al. |
| 2011/0055585 A1* | 3/2011 | Lee .................. H04L 9/3226 |
| | | 713/183 |
| 2011/0176681 A1* | 7/2011 | Yamada ............. H04L 9/0891 |
| | | 380/281 |
| 2012/0028609 A1 | 2/2012 | Hruska |
| 2013/0019098 A1 | 1/2013 | Gupta et al. |
| 2013/0124866 A1* | 5/2013 | Farrugia ........... H04L 9/0825 |
| | | 713/171 |
| 2013/0145447 A1 | 6/2013 | Maron |
| 2014/0153721 A1* | 6/2014 | Malone ............. H04L 9/3271 |
| | | 380/259 |
| 2014/0304505 A1* | 10/2014 | Dawson ............. G06F 21/6227 |
| | | 713/165 |
| 2016/0012465 A1 | 1/2016 | Sharp |
| 2016/0094347 A1 | 3/2016 | Fan |
| 2016/0099950 A1 | 4/2016 | Cuff et al. |
| 2016/0291856 A1 | 10/2016 | Von Muhlen et al. |
| 2017/0004320 A1* | 1/2017 | Erofeev ................ H04L 9/088 |
| 2017/0187678 A1 | 6/2017 | Wang et al. |
| 2020/0028680 A1 | 1/2020 | Scheiblauer et al. |
| 2020/0125747 A1 | 4/2020 | Hamel et al. |
| 2020/0228315 A1* | 7/2020 | Fiske .................. H04L 9/0643 |
| 2021/0203497 A1 | 7/2021 | Karame |
| 2021/0314313 A1 | 10/2021 | Uhr et al. |

\* cited by examiner

DERIVED UNIQUE KEY PER RAINDROP (DUKPR)

CROSS-REFERENCE TO RELATED APPLICATIONS

This application is a divisional of and claims priority to U.S. patent application Ser. No. 16/892,881, filed Jun. 4, 2020, which is a continuation of and claims priority to U.S. patent application Ser. No. 15/913,028, filed Mar. 6, 2018, the contents of which are incorporated herein by reference in their entirety.

BACKGROUND

Typically, cloud storage providers are expected to protect their client's data by employing at least a unique key per client or cloud subscriber. Traditional encryption management mechanisms include the cloud providers managing cryptographic keys in software, the cloud providers managing cryptographic keys in hardware, or the cloud subscribers managing cryptographic keys in demilitarized zones (DMZs) of the cloud subscribers.

SUMMARY

In one arrangement, a method for a key management server to manage encryption for data stored by a cloud provider server includes receiving, by the key management server from the cloud provider server, a request for a drop key. The request includes a hash drop identifier that uniquely identifies a cipher drop, and the cipher drop comprises a unit of data stored by the cloud provider server. The method further includes generating the drop key based on at least the hash drop and the drop identifier and encrypting the drop key. A response comprising the encrypted drop key is sent to the cloud provider server.

In one arrangement, a cloud provider server includes a processing circuit configured to send to a key management server a request for a drop key corresponding to a cipher drop. The cipher drop is a unit of data stored by the cloud provider server. The request includes at least a hash drop and a drop identifier, and the drop identifier uniquely identifies the cipher drop. The processing circuit is further configured to receive the drop key and decrypt the cipher drop with the drop key. The drop key is derived based on the hash drop and the drop identifier.

In one arrangement, a method for a cloud provider server to manage encryption includes fetching a first drop key that is uniquely associated with a cipher drop, where the cipher drop comprises a unit of data stored by the cloud provider server. The method further includes decrypting the cipher drop with the first drop key to obtain a first drop, where the first drop includes unencrypted data associated with the cipher drop. The first drop is processed to obtain a second drop, and the first drop is compared to the second drop. In response to determining that the first drop is the same as the second drop, the first drop and the first drop key are destroyed.

These and other features, together with the organization and manner of operation thereof, will become apparent from the following detailed description when taken in conjunction with the accompanying drawings.

DETAILED DESCRIPTION

Arrangements described herein relate to managing encryption for data stored and managed by a cloud provider using a derived unique key per raindrop (DUKPR) mechanism. The cloud provider implements data at-rest encryption such as but not limited to, database encryption. The DUKPR mechanism can be implemented using cryptographic software in some implementations and using hardware modules in other implementations.

The information stored by the cloud provider can be decomposed into data elements or units of data. A data element or a unit of data is referred to herein as a "raindrop." Each raindrop is encrypted using a unique key (referred to herein as a drop key (DK)) transported via a suitable key agreement method (such as but not limited to, a key agreement with ephemeral keys (KAE) scheme) to further provide forward secrecy. The DK is provided to the cloud provider by a key manager on an as-needed basis, such that the cloud provider itself does not maintain a DK for each encrypted raindrop stored thereon. The key manager can derive the DK responsive to a request from the cloud provider for the DK. The key manager authenticates the request and authorizes the cloud provider, before delivering an encrypted version of the DK. Thus, the cloud provider only needs to store the encrypted raindrops. All other data such as but not limited to, cleartext drops, DKs used in encrypting or decrypting the encrypted raindrops, and transaction keys (TKs) and ephemeral keys for securely transporting the DK using the KAE scheme are immediately destroyed from the cloud provider after usage. Once destroyed, such data cannot be recovered.

Traditionally, cloud providers themselves manage keys for data stored on their systems, for example, through software or a hardware security module (HSM). No conventional key management schemes therefore destroy keys to ensure that those keys do not remain on the cloud providers' systems because the cloud providers manage the keys.

On the other hand, arrangements described herein eliminate security risks associated with storing cryptographic keys locally on the cloud provider because the cloud providers do not retain any information that allows the encrypted raindrops to be decrypted. The arrangements described herein relate to procedures (e.g., cryptographic techniques, key management schemes, and the like), monitoring tools, and audits for assuring that the used cryptographic keys managed by traditional mechanisms are destroyed from the cloud providers' systems. The arrangements described herein meet and exceed the security standard requirement of supporting a unique key per client by supporting a unique key per raindrop. Thus, cloud providers that do not employ unique key per client can meet the requirement for providing unique key per client or unique key per data element using the DUKPR mechanism described herein. Accordingly, arrangements described herein involve a set of rules and algorithms that improve digital encryption management in cloud providers, thus automating an encryption management process not previously automated before.

An cryptographic key refers to an encryption key (such as but not limited to, a static key, an asymmetric key, and an ephemeral key), a token, a certificate, or the like. While encryption keys are used throughout the disclosure as examples, other types of cryptographic keys can be likewise managed by the DUKPR mechanism.

Figure 1:
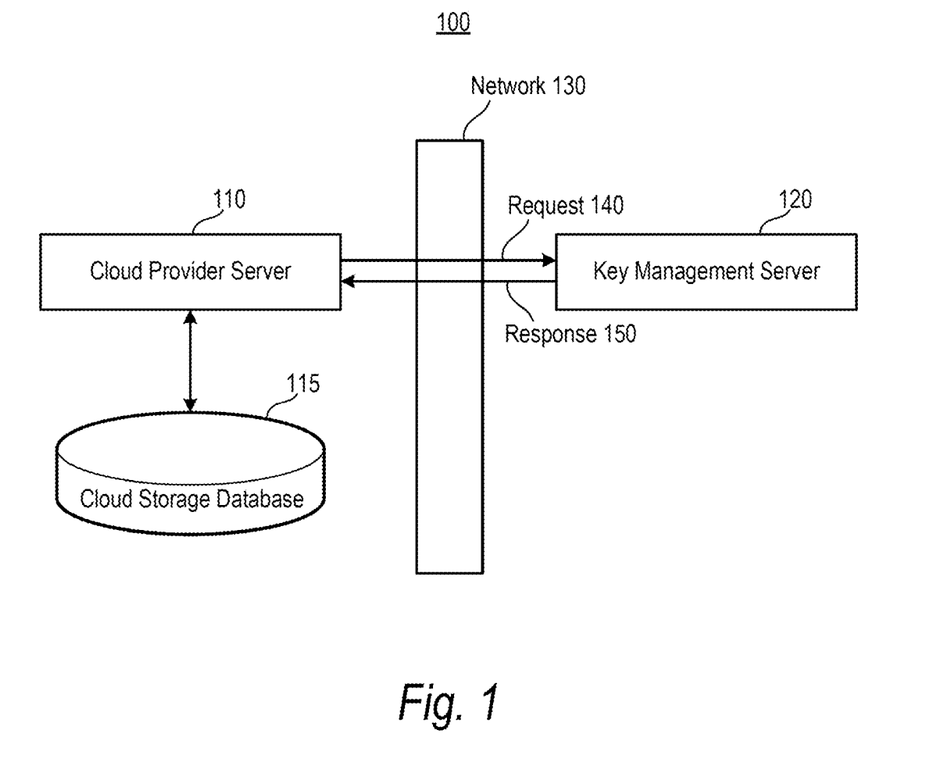
FIG. 1 is a diagram of a system for managing encryption for data stored and managed by a cloud provider server, according to some arrangements.

FIG. 1 is a diagram of a system 100 for managing encryption for data stored and managed by a cloud provider server 110, according to some arrangements. Referring to FIG. 1, the system 100 includes at least the cloud provider server 110 and a key management server 120. Each of the cloud provider server 110 and the key management server 120 is a computing system having suitable processing, storage, and networking capabilities.

The cloud provider server 110 stores and manages data for various clients or cloud subscribers. The clients or cloud subscribers can upload the data to the cloud provider server 110 for cloud storage. The cloud provider server 110 is operatively coupled to or includes a cloud storage database 115 in which the data is stored. The collective data stored in the cloud storage database 115 is referred as a "data lake," which is composed of raindrops.

As described, a raindrop represents a collection of data units. Each raindrop stored in the cloud storage database 115 is assigned a unique raindrop identifier (ID). Each raindrop stored in the cloud storage database 115 is or includes units of encrypted data, referred to herein as "cipher drops." Each cipher drop is uniquely identified by a drop ID. A raindrop includes the cipher drop(s) and associated metadata. In some examples, a raindrop may include one cipher drop and associated metadata. In other examples, a raindrop may include two or more cipher drops and associated metadata. The number of cipher drops (and associated metadata) in a given raindrop may depend on a governing data or database storage schema. In an example in which nine data units (e.g., three names, three social security numbers (SSNs), and three addresses) need to be stored, each data unit can be stored in a raindrop, or three data units (a name, an associated SSN, and an associated address) can be stored in a same raindrop. In an implementation in which the raindrops are cells in a database, some data units are encrypted using the DUKPR scheme described herein while other data units are cleartext, allowing backward compatibility with existing databases. A use case is that the data encryption algorithm is a Format Preserving Encryption (FPE) algorithm, where the cleartext and ciphertext data units have the same length and data types (e.g. a numeric data type). A client or cloud subscriber of the cloud provider server 110 can be identified by at least one client ID. The client ID can be used for authentication.

For example, a given client (identified by a unique client ID) can execute multiple applications, each of which is identified by a unique raindrop ID. In other words, each application corresponds to a raindrop. Given that an initial key (IK) can be derived based on the raindrop ID as disclosed herein, each application is associated with a unique IK. Each raindrop includes multiple cipher drops and metadata (e.g., timestamps) associated therewith. Thus, the cipher drops refer to units of data associated with a particular application or raindrop. Given that a DP can be derived based on the IK and the drop ID, each cipher drop is associated with a unique DK. In some arrangements, the raindrop ID and the drop ID are 64-bit or 128 bit random global unique identifier (GUID) assigned by the cloud provider server.

The key management server 120 manages cryptographic keys for the cloud provider server 110 in that the key management server 120 can generate a unique encryption key, IK, for each raindrop stored in the cloud storage database 115. That is, the IK generated for a given raindrop is unique to that raindrop. In addition, the key management server 120 can generate a unique encryption key, DK, for each cipher drop included in the raindrop. The DK can encrypt a cleartext drop to generate a cipher drop or decrypt a cipher drop to obtain a cleartext drop. In some arrangements, a DK is generated when the cleartext drop data needs to be changed due to data processing. The cloud provider server 110 itself cannot generate the DK to encrypt the cleartext drop or decrypt the cipher drop. In some arrangements, the key management server 120 is a part of a client or a cloud subscriber device, such that the DUKPR mechanism allows the client or the cloud subscriber device to truly manages its own cryptographic keys—something that the traditional encryption management mechanisms could not achieve. This can be achieved by including the key management server 120 as a part of a HSM—an implementation for cloud in-house deployment. In some arrangements, the key management server 120 can be provided by a cloud provider also providing the cloud provider server 110. In some arrangements, the key management server 120 can be provided by a third-party service provider (TPSP).

Thus, in order for the cloud provider server 110 to obtain the DK, the cloud provider server 110 sends a request 140 to the key management server 120. The request 140 includes at least the raindrop ID and a drop ID. The key management server 120 retains a base key (BK) that can be used for requests originating from the cloud provider server 110 and/or another suitable cloud provider. In some arrangements, the same BK can be used for requests originating from two or more cloud providers. In some arrangements, the BK can be used for requests originating from a single cloud provider. The key management server 120 uses the BK and the raindrop ID as inputs to a first function (F) to generate an IK.

In some arrangements, the first function (F) can be a one-way function. Illustrating with a non-limiting example, the first function (F) can be a Secure Hash Standard (SHS) (FIPS 180-4), which defines a SHA-2 hash function (e.g., a SHA-256 hash function or a SHA-512 hash function) and a SHA-3 hash function. Illustrating with another non-limiting example, the first function (F) can be a HMAC function (FIPS 198-1). A one-way function returns a result determined based on an input in a forward operation. In a reverse operation, it is computationally complex or almost impossible to use the one-way function to derive the input based on the result. In other examples, the first function (F) can be another suitable function.

The key management server 120 uses the IK, the hash drop, and the drop ID as inputs to a second function (G) to generate the DK. In other words, the DK is a crypto-binding between the hash drop and the drop ID. In some arrangements, the second function (G) can be used for forward secrecy and prevents discovery of any intermediary values (e.g., the IK) and the original input based on which the intermediary values are determined. In some arrangements, the second function (G) is a one-way function. In some arrangements, the second function (G) is a one-way hash function. Illustrating with a non-limiting example, the second function (G) can be a SHS, which defines a SHA-2 hash function and a SHA-3 hash function. Illustrating with another non-limiting example, the second function (G) can be a HMAC function (FIPS 198-1). In other examples, the second function (G) can be another suitable function.

In some arrangements, the first function (F) is a same function/algorithm as the second function (G), or at least has a same hash value as that of the second function (G). In other arrangements, the first function (F) is a different function/algorithm from the second function (G), or at least has a different hash value as that of the second function (G).

The DK can be encrypted using a suitable KMS, such that the DK can be sent to the cloud provider server 110 in some secured fashion. The KMS can generate a TK for encrypting the DK. Examples of a KMS include but are not limited to, a Diffie-Hellman (DHE), an ephemeral elliptic curve Diffie-Hellman (ECDHE) scheme, a post-quantum space scheme, a random space binomial scheme, lattice space polynomial scheme, and a KAE. While KAE is used throughout the disclosure as an example of the KMS, another suitable KMS can be likewise implemented to provide forward secrecy for the DK. Using KAE as an example, if the cloud provider server 110 or the key management server 120 is compromised (e.g., the request 140 and/or a response 150 are recorded), the TK (therefore the DK) is unrecoverable because the private ephemeral keys of the key management server 120 that are used in the KAE have become unavailable.

The key management server 120 can send the response 150 to the cloud provider server 110. The response 150 includes the DK encrypted using the TK (referred to herein as Tx(DK)) and information (e.g., cryptographic message syntax (CMS) for the KAE) based on which the Tx(DK) can be decrypted. As used herein, the term "x" in Tx(DK) is used to emphasize that each iteration as an associated, unique key (e.g., using the KAE), where Tx(DK) and TK(DK) may be used interchangeably. The cloud provider server 110 can then decrypt the Tx(DK) to generate the DK. The cloud provider server 110 can use the DK to decrypt the cipher drop.

The request 140 and the response 150 can be communicated via a network 130 in some arrangements in which the key management server 120 is separated from the cloud provider server 110. In such arrangements, the key management server 120 can be operated by a cloud subscriber or client. The network 130 is any suitable Local Area Network (LAN), Wide Area Network (WAN), the Internet, an external network, an internal network, or a combination thereof. For example, the network 130 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1x Radio Transmission Technology (1x), General Packet Radio Service (GPRS), Personal Communications Service (PCS), 802.11X, ZigBee, Bluetooth, Wi-Fi, any suitable wired network, combination thereof, and/or the like. The network 130 is structured to permit the exchange of data, values, instructions, messages, and the like.

Figure 2:
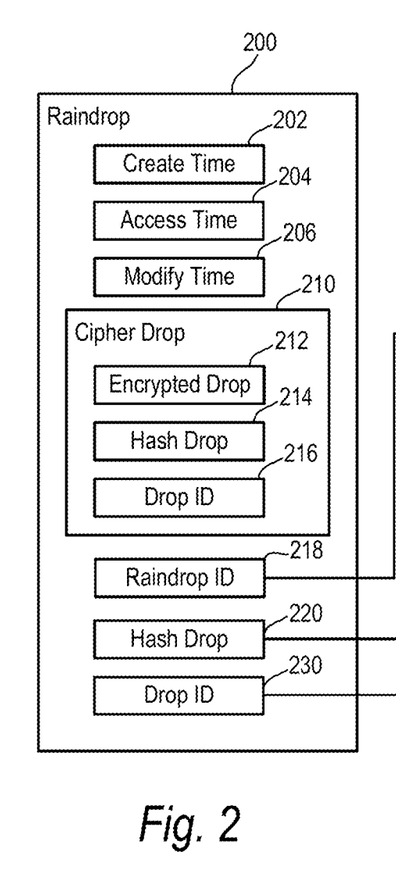
FIG. 2 is a schematic block diagram illustrating a raindrop, according to some arrangements.

FIG. 2 is a schematic block diagram illustrating a raindrop 200, according to some arrangements. Referring to FIGS. 1-2, the raindrop 200 refers to a collection or group of data elements or units of data stored in the cloud storage database 115. As described, each unit of data corresponds to a cipher drop (e.g., cipher drop 210). While one cipher drop 210 is shown in FIG. 2 for brevity and clarity, multiple cipher drops similar to the cipher drop 210 can be included in the raindrop 200. As described, each cipher drop 210 has a unique ID (e.g., encrypted drop ID 216 and drop ID 230). In some arrangements, the raindrop 200 is or includes one or more entries in a block chain or one or more blocks of a block chain.

In some arrangements, the raindrop 200 includes various timestamps for logistics. For example, the raindrop 200 includes a timestamp defining a create time 202, an access time 204, and a modify time 206. The create time 202 corresponds to a time at which the cipher drop 210 is created by the cloud provider server 110. The access time 204 corresponds to a time at which the cipher drop 210 was most recently accessed (e.g., read, decrypted, copied, transported, or modified). The modify time 206 corresponds to a time at which the cipher drop 210 was most recently modified. Similar timestamps for other cipher drops (not shown) can be similarly implemented.

The cipher drop 210 is encrypted with the DK derived by the key management server 120. In one example, the cipher drop 210 includes an encrypted drop 212, an encrypted hash drop 214, and an encrypted drop ID 216. The encrypted drop 212 a cleartext drop that has been encrypted by the DK. The cleartext drop refers to unencrypted data unit. The encrypted hash drop 214 is a hash of the cleartext drop, where the hash has been encrypted by the DK within the cipher drop 210. The encrypted drop ID 216 is the unique drop ID that uniquely identifies the cleartext drop within the raindrop 200 when decrypted.

While in the example shown in FIG. 2, the cipher drop 210 is shown to include the components 212, 214, and 216, the cipher drop 210 generally refers to an encrypted version of any cleartext data unit and/or an encrypted version of a hash of any cleartext data unit. Examples of such cleartext data include but not limited to, a payment card number (e.g., a credit card number, a debit card number, and the like), a financial account number, a password, social security number, a name, an address, an email address, and any Personally Identifiable Information (PII). The examples of the cleartext data presented herein are not intended to be an exhaustive list of all possible implementations of the cleartext data that can be encrypted by the DK to form the cipher drop 210. The cleartext data is used to refer to any unencrypted information that is protected by the DK.

In some arrangements, the raindrop 200 includes a cleartext hash drop 220, which is the hash of the cleartext drop, without the encryption by the DK. Thus, the cleartext hash drop 220 is an unencrypted, cleartext version of the encrypted hash drop 214. Given that the only record of the data (e.g., the encrypted drop 212) is in the cipher drop 210, by having the hash drop 220 being outside of the encrypted entity cipher drop 210, hash checking can be performed as an integrity mechanism. For example, if the encrypted hash drop 214 were not in the cipher drop 210, the hash drop data may be vulnerable to manipulation. On the other hand, if the hash drop were only in the cipher drop 210 and the decryption was faulty, there's a chance that the hash drop may not verify. Therefore, by having the hash drop (214 and 220) inside and outside of the cipher drop 210, probability of errors can be practically reduced to zero. In such arrangements, the cloud provider server 110 has the record of what the hash drop should be before and after the decryption, such that if the cleartext hash drop 220 and the decrypted hash value (decrypted from the encrypted drop 212) do not match, an error can be immediately detected. In some arrangements, the raindrop 200 includes a cleartext drop ID 230, without the encryption by the DK. Thus, the cleartext drop ID 230 is an unencrypted, cleartext version of the encrypted drop ID 216. In some arrangements, the raindrop 200 further includes the raindrop ID 218. The cipher drops stored in the raindrop 200 share the same raindrop ID 218. In some arrangements, the hash drop 220 may be a SEQUENCE of the hash drop 220 and the drop ID 230.

In the cloud storage database 115, two separate drops may have the same underlying data value (e.g., the same cleartext drop). Given that a hash function with a same input value generate same results, the hashes of two cleartext drops having the same value yield a same result. As such, using the cleartext hash drop 220 as an input to generate the DK would not yield a unique DK per raindrop. To address the possibility of duplicate hash drop, the cleartext drop ID 230 (which is itself unique to the cipher drop 210) is used as an additional input to generate the DK can assure a unique DK per drop.

Figure 3A:
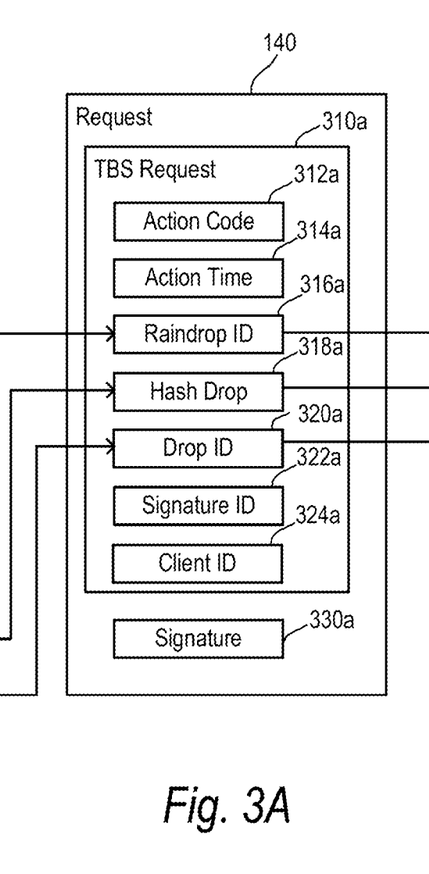
FIG. 3A is a schematic block diagram illustrating the request shown in FIG. 1, according to some arrangements.

FIG. 3A is a schematic block diagram illustrating the request 140 shown in FIG. 1, according to some arrangements. Referring to FIGS. 1-3A, the cloud provider server 110 can generate and send the request 140 to the key management server 120 to request the DK. The request 140 can be defined in suitable formats such as in a protocol data unit (PDU). The request 140 includes a data to-be-assigned (TBS) request 310a.

The request 310a includes action information (metadata) such as but not limited to, an action code 312a and an action time 314a. The action code 312a is a parameter or value that indicates the nature of the message corresponding to the request 140. That is, the action code 312a indicates that the request 140 is a request for a DK. The action time 314 is a timestamp indicative of a time at which the request 140 is generated.

The request 310a includes a raindrop ID 316a that uniquely identifies a raindrop, which can be associated with a particular application run by a client of the cloud provider server 110. The raindrop ID 316a may echo fields associated with the raindrop ID 218. The raindrop ID 316a can be in any suitable format, including in a string format. Furthermore, the request 310a includes a hash drop 318a and a drop ID 320a. The hash drop 318a and the drop ID 320a are in cleartext and echo fields associated with the hash drop 220 and the drop ID 230, respectively.

The request 140 can be digitally signed by the cloud provider server 110 using an digital signature (e.g., a signature 330a) that can be used by the key management server 120 for authenticating the origin of the request 140. The request 310a can include a signature ID 322a that uniquely identifies a signature algorithm associated with the signature 330a. In some arrangements, the signature ID 322a includes two object identifiers (OIDs). One OID indicates the signature algorithm (e.g. Rivest-Shamir-Adleman (RSA), digital signature algorithm (DSA), elliptic curve digital signature algorithm (ECDSA), and the like). Another OID indicates the hash function used with the signature algorithm.

In some arrangements, the request 310a includes a client ID 324a that identifies the client or cloud subscriber of the cloud provider server 110. The key management server 120 can authenticate the request 310a based on the client ID 324a.

Figure 3B:
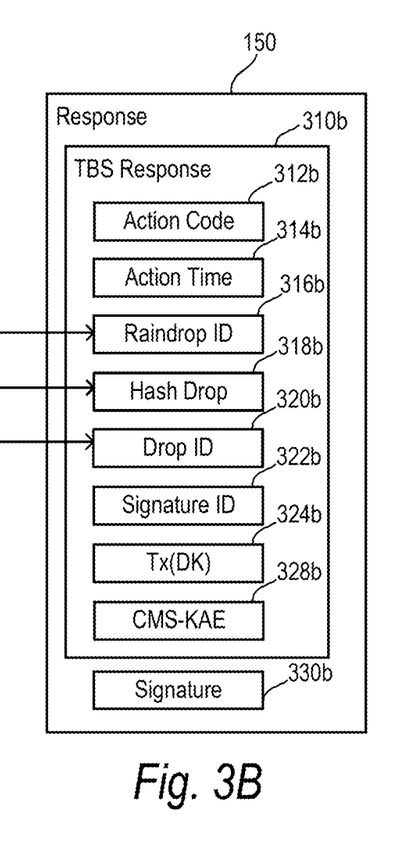
FIG. 3B is a schematic block diagram illustrating the response shown in FIG. 1, according to some arrangements.

FIG. 3B is a schematic block diagram illustrating the response 150 shown in FIG. 1, according to some arrangements. Referring to FIGS. 1-3B, the key management server 120 can generate and send the response 150 to the cloud provider server 110 to issue an encrypted version of the DK. The response 150 includes a TBS response 310b.

The response 310b includes action information (metadata) such as but not limited to, an action code 312b and an action time 314b. The action code 312b is a parameter or value that indicates the nature of the message corresponding to the response 150. In some arrangements, the action code 312b corresponds to the action code 312a. That is, the action code 312b indicates that the response 150 includes an encrypted version of the DK in some examples. In some examples, the action code 312b can indicate errors if the DK cannot be generated or cannot be sent to the cloud provider server 110. For example, the action code 312b can indicate that the request 140 or the client associated with the request 140 has failed to authenticate. The action time 314b is a timestamp indicative of a time at which the response 150 is generated.

The response 310b includes a raindrop ID 316b that uniquely identifies the raindrop, which is associated with the particular application run by the client of the cloud provider server 110 or the cloud storage database 115. The raindrop ID 316b echo fields associated with the raindrop ID 316a. Furthermore, the response 310b includes a hash drop 318b and a drop ID 320b, which echo fields associated with the hash drop 318a and the drop ID 320a, respectively.

The response 150 can be digitally signed by the key management server 120 using an digital signature (e.g., a signature 330b) that can be used by the cloud provider server 110 for authenticating the origin of the response 150. The response 310b can include a signature ID 322b that uniquely identifies a signature algorithm associated with the signature 330b.

The response 310b further includes Tx(DK) 324b, which is an encrypted version of the DK. The Tx(DK) 324b is the result of the DK being encrypted using a TK generated via a suitable KMS (e.g., KAE) in the manner described. The TK itself may not be sent to the cloud provider server 110. The response 310b includes decryption information (e.g., CMS-KAE 328b) that can be used to decrypt the Tx(DK) 324b in order to recover or decrypt the DK. For instance, the CMS-KAE contains information based on which the raindrop cryptography circuit 410 can replicate the same TK generated at by the key management server 120, even though the TK itself is not sent to the cloud provider server 110.

Figure 4A:
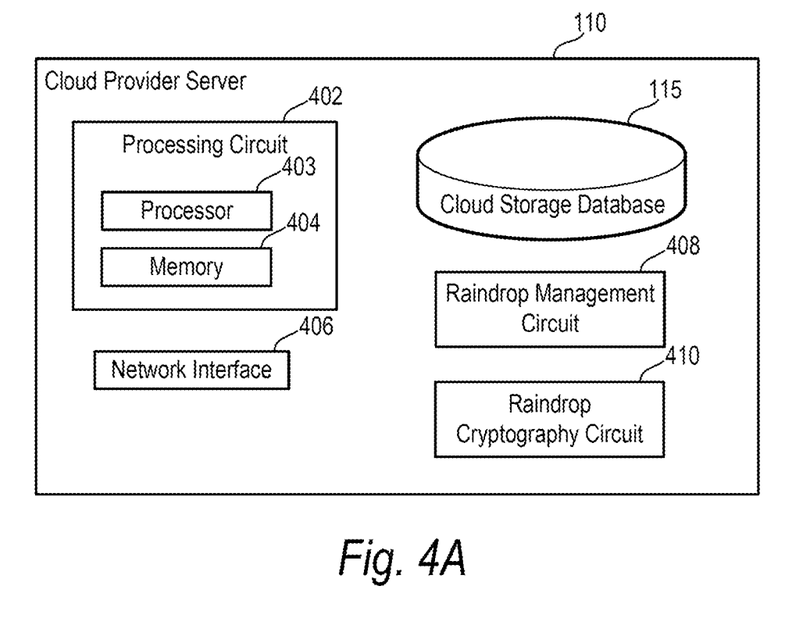
FIG. 4A is a schematic block diagram illustrating the cloud provider server shown in FIG. 1, according to some arrangements.

FIG. 4A is a schematic block diagram illustrating the cloud provider server shown in FIG. 1, according to some arrangements. Referring to FIGS. 1-4A, the cloud provider server 110 is shown to include various circuits and logic for implementing the operations described herein. More particularly, the cloud provider server 110 includes one or more of a processing circuit 402, a network interface 406, a raindrop management circuit 408, a raindrop cryptography circuit 410, and the cloud storage database 115. While various circuits, interfaces, and logic with particular functionality are shown, it should be understood that the cloud provider server 110 includes any number of circuits, interfaces, and logic for facilitating the operations described herein. For example, the activities of multiple circuits are combined as a single circuit and implemented on a same processing circuit (e.g., the processing circuit 402), as additional circuits with additional functionality are included.

In some arrangements, the processing circuit 402 having a processor 403 and a memory 404. The processor 403 can be implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 404 stores data and/or computer code for facilitating the various processes described herein. The memory 404 can be implemented as Random Access Memory (RAM), Read-Only Memory (ROM), Non-volatile RAM (NVRAM), Flash Memory, hard disk storage, and the like. Moreover, the memory 404 is or includes tangible, non-transient volatile memory or non-volatile memory. Accordingly, the memory 404 includes database components, object code components, script components, or any other type of information structure for supporting the various activities and information structures described herein.

The network interface 406 is configured for and structured to communicate data over the network 130. For example, the network interface 406 is configured for and structured to send the request 140 and receive the response 150. Accordingly, the network interface 406 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The raindrop management circuit 408 can be implemented with the processing circuit 402 in some arrangements. The raindrop management circuit 408 is configured to perform storage, management, and access functions for the raindrops stored in the cloud storage database 115. The raindrop management circuit 408 can facilitate reading, copying, deleting, modifying, or transporting the cipher drop 210 or the underlying cleartext data.

The raindrop cryptography circuit 410 can be implemented with the processing circuit 402 in some arrangements. The raindrop cryptography circuit 410 can is configured to perform encryption and encryption functions for the raindrops stored in the cloud storage database 115. For example, the raindrop cryptography circuit 410 can generate the request 140, recover the DK based on the response 150, and decrypt/re-encrypt the raindrop 200 using the DK.

Figure 4B:
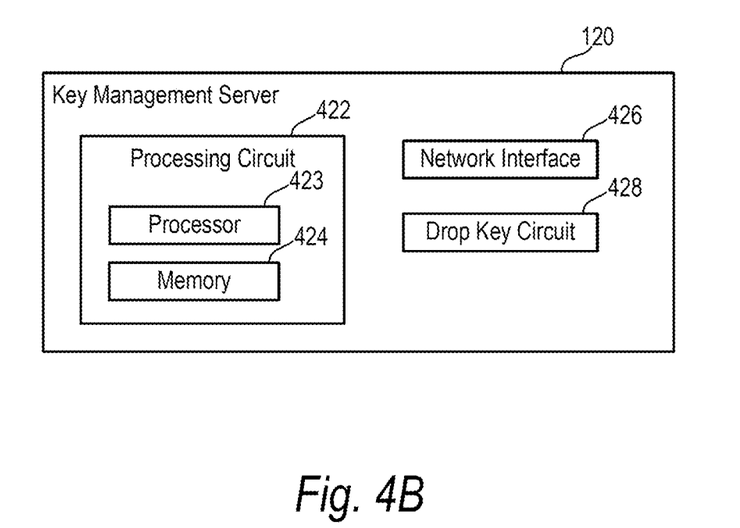
FIG. 4B is a schematic block diagram illustrating the key management server shown in FIG. 1, according to some arrangements.

FIG. 4B is a schematic block diagram illustrating the key management server 120 shown in FIG. 1, according to some arrangements. Referring to FIGS. 1-4B, the key management server 120 is shown to include various circuits and logic for implementing the operations described herein. More particularly, the key management server 120 includes one or more of a processing circuit 422, a network interface 426, and a drop key circuit 428. While various circuits, interfaces, and logic with particular functionality are shown, it should be understood that the key management server 120 includes any number of circuits, interfaces, and logic for facilitating the operations described herein. For example, the activities of multiple circuits are combined as a single circuit and implemented on a same processing circuit (e.g., the processing circuit 422), as additional circuits with additional functionality are included.

In some arrangements, the processing circuit 422 has a processor 423 and a memory 424. The processor 423 can be implemented as a general-purpose processor, an ASIC, one or more FPGAs, a DSP, a group of processing components, or other suitable electronic processing components. The memory 424 stores data and/or computer code for facilitating the various processes described herein. The memory 424 can be implemented as RAM, ROM, NVRAM, Flash Memory, hard disk storage, and the like. Moreover, the memory 424 is or includes tangible, non-transient volatile memory or non-volatile memory. Accordingly, the memory 424 includes database components, object code components, script components, or any other type of information structure for supporting the various activities and information structures described herein.

The network interface 426 is configured for and structured to communicate data over the network 130. For example, the network interface 426 is configured for and structured to receive the request 140 and send the response 150. Accordingly, the network interface 426 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The drop key circuit 428 can be implemented with the processing circuit 422 in some arrangements. The drop key circuit 428 is configured to generate the IK via the first function (F), using the raindrop ID 316a and the BK as inputs. The drop key circuit 428 is further configured to generate the DK via the second function (G), using the IK, the hash drop 318a, and the drop ID 320a as inputs. Furthermore, the drop key circuit 428 can encrypt the DK using a suitable KMS for transport to the cloud provider server 110.

In some examples, the key management server 120 can be, include, or be included by a cryptographic module such as but not limited to, a HSM. In that regard, the BK and the process of generating the TK can be tightly coupled within a cryptographic boundary. The cryptographic boundary is defined by a cryptographic hardware (e.g., the HSM) that is designed to, in case of a penetration or tampering attempt, automatically destroy the BK and the TK to preserve system integrity. The key management server 120 in such arrangements can be operated by the cloud subscriber or client. The HSM can be deployed within the cloud provider server 110 such that the DK or any encrypted version thereof does not need to be openly communicated via the network 130. In such arrangements, the network 130, the network interface 406, and the network interface 426 are not be needed. Thus, the BK can be perfectly protected inside key management server 120. In some arrangements, the client or cloud subscriber may have control over the key management server 120 residing in cryptographic hardware. The cryptographic hardware can be installed at a cloud service location such that the request 140 and the response 150 can be communicated on a local network (e.g., the network 130 is a local network). In other arrangements, the DUKPR mechanism can be implemented using cryptographic software.

Figure 5:
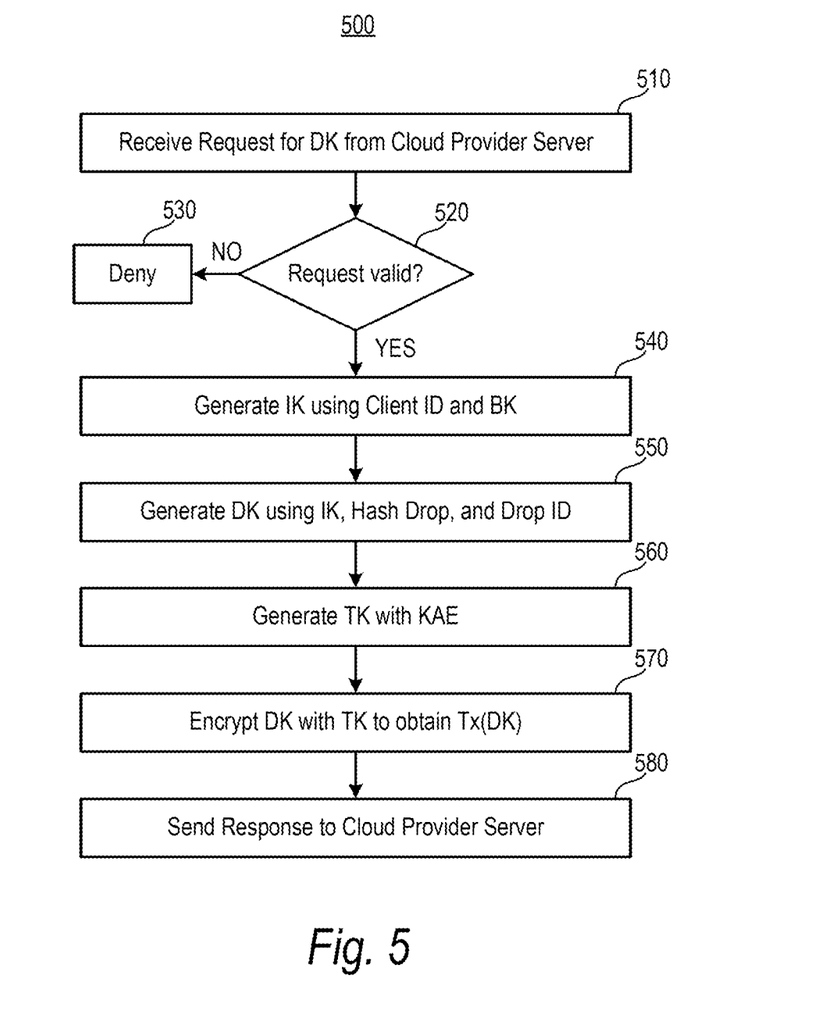
FIG. 5 is a flow diagram illustrating a method for managing encryption for data stored and managed by a cloud provider server, according to some arrangements.

FIG. 5 is a flow diagram illustrating a method 500 for managing encryption for data stored and managed by the cloud provider server 110 (FIG. 1), according to some arrangements. Referring to FIGS. 1-5, the method 500 can be performed by the key management server 120.

At 510, the key management server 120 receives, from the cloud provider server 110, a request to issue a DK. An example of the request includes the request 140, which includes the raindrop ID 316a and a unique identifier (e.g., the drop ID 320a) that uniquely identifies the raindrop 200 for which a DK is requested. As described, the request 140 includes the digital signature 330a of the cloud provider server 110, indicating that the request 140 is digitally signed by the cloud provider server 110. Based on the action code 312a, the drop key circuit 428 determines that the request 140 is for generating a DK corresponding to raindrop 200, as identified by the drop ID 320a.

At 520, the drop key circuit 428 determines whether the request 140 is valid. In one example, the drop key circuit 428 authenticates the request 140 by determining the authenticity of the signature 330a. Responsive to determining that the signature 330a is authenticated, the request 140 is deemed to be valid by the drop key circuit 428. Other suitable authentication methods can be likewise implemented. Responsive to determining that the request is not valid (520:NO), the drop key circuit 428 denies the request 140 at 530. Denying the request 140 can include sending a notification message back to the cloud prover server 110 indicating that the request 140 is invalid in some arrangements.

On the other hand, in response to determining that the request is valid (520:YES), the drop key circuit 428 generates the DK. For example, at 540, the drop key circuit 428 generates an IK using the raindrop ID 316a and a BK. The drop key circuit 428 can execute the first function F(x,y) using the BK (as x) and the raindrop ID (as y) as inputs. The output of the first function (F) is the IK.

At 550, the drop key circuit 428 generates the DK using the IK, the hash drop 318a, and the drop ID 320a. Given that the drop ID 320a uniquely identifies the cipher drop 210 and the raindrop ID 316a uniquely identifies the raindrop 200, the DK generated based on both unique identifiers is unique to the cipher drop 210. For instance, the second function (G) can be represented with expression G(x,y,z), where x is the IK, y is the hash drop 318a, and z is the drop ID 320a. In the arrangements in which the raindrop 200 includes multiple cipher drops such as but not limited to the cipher drop 210, the same drop (e.g., underlying data associated with the encrypted drop 212) can occur more than once in the raindrop 200. In such arrangements, the hash drop 318a, which is a hash of the drop, can be modified in accordance with the changes to the drop, while the drop ID 320a remains the same. Thus, by using IK, the hash drop 318a, and the drop ID 320a as inputs to the second function (G), uniqueness per drop can be achieved.

At 560, the drop key circuit 428 generates a TK using KAE. An example of the KAE method includes one that is encoded per X9.73 CMS. In some arrangements, the KAE creates a unique transactional key TK per response such that if the same DK is requested the encrypted ciphertext, the TK and the Tx(DK) 324b are different in each response. As described, another KMS can be used to provide forward secrecy for the DK.

At 570, the drop key circuit 428 encrypts the DK with the TK to obtain Tx(DK) 324b. At 580, the drop key circuit 428 configures the network interface 426 to send the Tx(DK) 324b to the cloud provider server 110. For example, the response 150 is sent to the cloud provider server 110. The response 150 includes the Tx(DK) 324b. In addition, the response 150 includes CMS-KAE 328b, which represents the key agreement ephemeral information being shared with the cloud provider server 110 in order for the cloud provider server 110 to generate ephemeral keys and/or certificates used to decrypt the Tx(DK) 324b. The response 150 can be signed by the drop key circuit 428 such that the signature 330b is added to the response 150.

Figure 6:
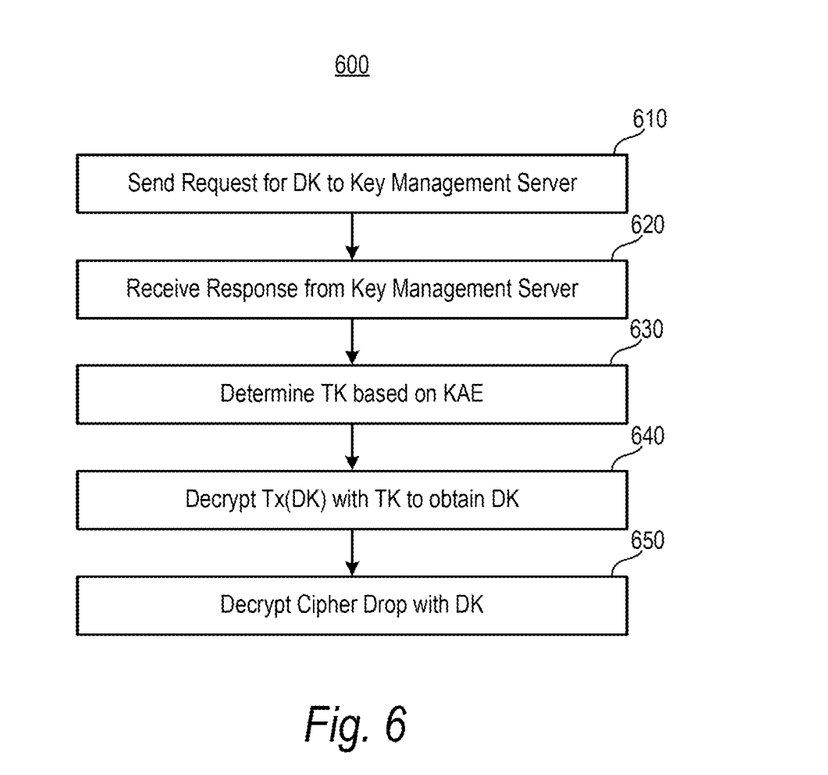
FIG. 6 is a flow diagram illustrating a method for managing encryption for data stored and managed by a cloud provider server, according to some arrangements.

FIG. 6 is a flow diagram illustrating a method 600 for managing encryption for data stored and managed by the cloud provider server 110 (FIG. 1), according to some arrangements. Referring to FIGS. 1-6, the method 600 can be performed by the cloud provider server 110. The raindrop management circuit 408 can notify the raindrop cryptography circuit 410 to generate the request 140 in response to determining that the encrypted drop 212 is to be decrypted for reading, copying, deleting, modifying, or transporting.

At 610, the raindrop cryptography circuit 410 configures the network interface 406 to send the request 140 to the key management server 120. At 620, the cloud provider server 110 receives the response 150 from the key management server 120. The response 150 is received if the encrypted DK Tx(DK) 324b is successfully generated. At 630, the raindrop cryptography circuit 410 determines the TK based on the KAE. For example, the raindrop cryptography circuit 410 generates the TK using the CMS-KAE 328b. At 640, the raindrop cryptography circuit 410 decrypts the Tx(DK) using the TK to obtain the DK. At 650, the raindrop cryptography circuit 410 decrypts the cipher drop 210 with the DK. The encrypted drop 212 can thusly be decrypted using the DK.

The raindrop management circuit 408 can read, copy, delete, modifying, and/or transport the decrypted data. In some arrangement, in which the raindrop management circuit 408 does not modify any decrypted data (e.g., the decrypted data remains the same), the raindrop management circuit 408 destroys the cleartext decrypted data and the DK. Otherwise, if the raindrop management circuit 408 modifies the decrypted data, the raindrop cryptography circuit 410 determines a new hash of the modified data (e.g., a new version of the hash drop 220). This can be done using the same hash function or a different hash function. The raindrop cryptography circuit 410 can send the new hash of the modified data as part of a request to the key management server 120. The drop key circuit 428 can generate a new DK using the new hash of the modified data. In one example, the IK and the new hash of the modified data are used as inputs to the second function (G) to generate the new TK. The new hash of the modified data can uniquely identify the raindrop 200 after the previously encrypted data has been modified in some arrangements. In other arrangements, the hash of the raindrop ID (e.g., 230 and 320a), which may not change because the raindrop ID has not changed, can be used as input to the second function (G) instead of the new hash of the modified data. All cleartext data and the new DK are destroyed after usage.

In some arrangements, the cloud provider server 110 does not retain decrypted cipher drops, the DKs, and the TKs, such that if the cloud provider server 110 is compromised, the stored raindrops can remain encrypted because the decryption tools are destroyed after usage. In one example, responsive transporting (e.g., sending via a network to a client), modifying, or otherwise accessing a decrypted cipher drop, the raindrop cryptography circuit 410 destroys the decrypted cipher drop 210. In one example, responsive to decrypting the cipher drop 210 using the DK, the raindrop cryptography circuit 410 destroys the DK. In one example, responsive to decrypting a Tx(DK) using a TK, the raindrop cryptography circuit 410 destroys the TK.

While cloud provider services are used as applications of the DUKPR mechanism, e-vault applications such as but not limited to, DocuSign® and eOriginal® can likewise implement the DUKPR mechanism. For instance, each cloud-stored document can be assumed to be the raindrop 200, with encrypted data (e.g., a loan document, a mortgage document, and the like) being the cipher drop 210. The documents can be encrypted in the manner discussed with respect to the raindrop 200. If the document is to be read, modified (e.g., signed by an interested party), or transported (e.g., sent to an interested party), the raindrop cryptography circuit 410 can request a corresponding DK from the key management server 120.

Figure 7:
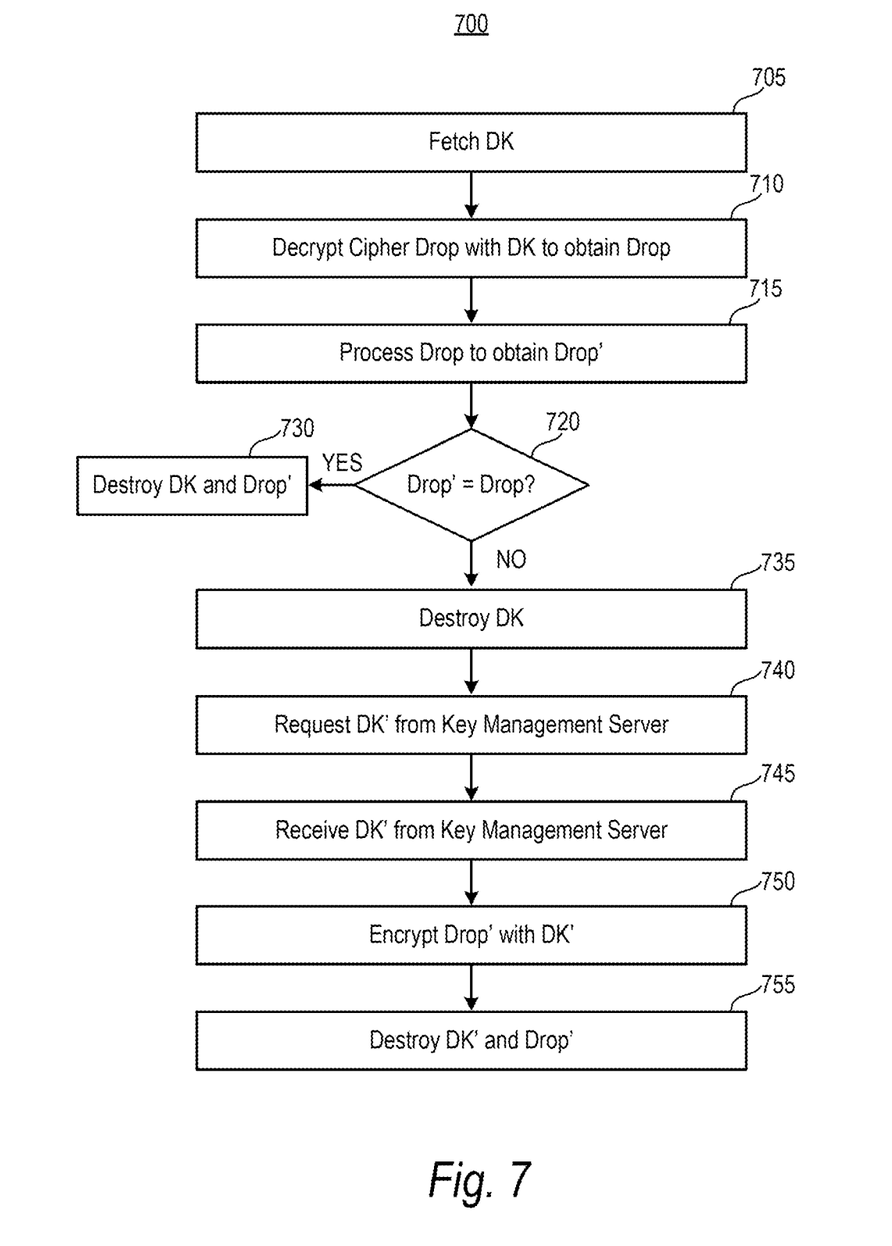
FIG. 7 is a flow diagram illustrating a method for managing encryption for data stored and managed by a cloud provider server, according to some arrangements.

FIG. 7 is a flow diagram illustrating a method 700 for managing encryption for data stored and managed by the cloud provider server 110 (FIG. 1), according to some arrangements. Referring to FIGS. 1-7, the method 700 can be performed by the cloud provider server 110.

At 705, the raindrop cryptography circuit 410 fetches the DK. For example, the raindrop cryptography circuit 410 can perform 610-640 to fetch the DK that is uniquely associated with the cipher drop 210. At 710, the raindrop cryptography circuit 410 decrypts the cipher drop 210 with the DK to obtain drop, which refers to the unencrypted data associated with the encrypted drop 212. 710 can be performed in a manner such as but not limited to, 650. At 715, the raindrop management circuit 408 processes the drop to obtain drop'. Processing the drop refers to one or more of reading, copying, transporting, or modifying the drop, which is cleartext. The drop' denotes the processed version of the drop.

At 720, the raindrop cryptography circuit 410 determines whether the drop' is the same as the drop. In other words, the raindrop cryptography circuit 410 determines whether the drop' has been modified during processing at 715. Responsive to determining that the drop' is the same as the drop (720:YES), the raindrop cryptography circuit 410 destroys the DK and the cleartext drop' (drop) at 730.

On the other hand, responsive to determining that the drop' is not the same as the drop (720:NO), the raindrop cryptography circuit 410 destroys the DK at 735. In such situations, a new DK (DK') is fetched to re-encrypt the deciphered drop. For example, at 740, the raindrop cryptography circuit 410 requests the DK' from the key management server 120. The request for the DK' may be similar to the request 140, with all included information being the same except for the hash drop, which is the hash of the new drop'. Given that drop and drop' are different, the hash of new drop' and hash drop 318*a* (which is the hash of drop) are also different.

Key management server 120 can perform the method 500 to derive the DK'. For example, the key circuit 428 generates an IK using the raindrop ID 316*a* and a BK. The raindrop ID 316*a* is not changed due to the change to drop. The key circuit 428 generates the DK' based on the IK, the new hash drop (hash of new drop'), and the drop ID 322*a*. At 745, the cloud provider server 110 receives the DK' from the key management server 120. For example, the DK' can be received in a response such as but not limited to, the response 150.

At 750, the raindrop cryptography circuit 410 encrypts the drop' with the DK'. At 755, the raindrop cryptography circuit 410 destroys the DK' s and the cleartext drop' in response to completion of the encryption at 750.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims.

What is claimed is:

1. A method for a cloud provider server to manage encryption, the method comprising:
   fetching, by a raindrop cryptography circuit, a first drop key that is uniquely associated with a cipher drop, wherein the cipher drop comprises a unit of data stored by the cloud provider server;
   decrypting, by the raindrop cryptography circuit, the cipher drop with the first drop key to obtain a first drop, wherein the first drop comprises unencrypted data associated with the cipher drop;
   processing, by the raindrop cryptography circuit, the first drop to obtain a second drop, wherein processing the first drop comprises one or more of copying or transporting the first drop;
   comparing, by the raindrop cryptography circuit, the first drop and the second drop to determine that the second drop is the same as the first drop following the processing of the first drop; and
   in response to determining that the first drop is same as the second drop, destroying, by the raindrop cryptography circuit, the first drop and the first drop key.

2. The method of claim 1, further comprising:
   requesting, by the raindrop cryptography circuit, a second drop key; and
   receiving, by the raindrop cryptography circuit, the second drop key.

3. The method of claim 2, further comprising:
   encrypting, by the raindrop cryptography circuit, the second drop with the second drop key; and
   destroying, by the raindrop cryptography circuit, the second drop and the second drop key.

4. The method of claim 1, wherein the first drop and the second drop comprise cleartext data.

5. The method of claim 1, further comprising decrypting, by the raindrop cryptography circuit, the first drop key prior to decrypting the cipher drop.

6. The method of claim 1, wherein the first drop is fetched based on a key agreement with ephemeral keys (KAE) scheme.

7. The method of claim 1, wherein fetching the first drop key comprises requesting, by the raindrop cryptography circuit, the first drop key from a key management server.

8. The method of claim 7, further comprising authenticating, by the raindrop cryptography circuit, the first drop key based on a digital signature provided by the key management server.

9. A system to manage encryption, the system comprising:
   a cloud provider server comprising a raindrop cryptography circuit, the raindrop cryptography circuit configured to:
   fetch a first drop key that is uniquely associated with a cipher drop, wherein the cipher drop comprises a unit of data stored by the cloud provider server;
   decrypt the cipher drop with the first drop key to obtain a first drop, wherein the first drop comprises unencrypted data associated with the cipher drop;

process the first drop to obtain a second drop, wherein processing the first drop comprises one or more of copying or transporting the first drop;

compare the first drop and the second drop to determine that the second drop is the same as the first drop following the processing of the first drop; and in response to determining that the first drop is same as the second drop, destroy the first drop and the first drop key.

10. The system of claim 9, wherein the raindrop cryptography circuit is further configured to:

request a second drop key; and receive the second drop key.

11. The system of claim 10, wherein the raindrop cryptography circuit is further configured to:

encrypt the second drop with the second drop key; and destroy the second drop and the second drop key.

12. The system of claim 9, wherein the first drop and the second drop comprise cleartext data.

13. The system of claim 9, wherein the raindrop cryptography circuit is further configured to decrypt the first drop key.

14. The system of claim 9, wherein the first drop is fetched based on a key agreement with ephemeral keys (KAE) scheme.

15. The system of claim 9, wherein the raindrop cryptography circuit is further configured to fetch the first drop key by performing operations comprising requesting the first drop key from a key management server.

16. The system of claim 15, wherein the raindrop cryptography circuit is further configured to authenticate the first drop key based on a digital signature provided by the key management server.

17. A non-transitory computer-readable medium with processor-executable instructions embodied thereon that, when executed by a raindrop cryptography circuit of a cloud provider server, cause the raindrop cryptography circuit to perform operations comprising:

fetching a first drop key that is uniquely associated with a cipher drop, wherein the cipher drop comprises a unit of data stored by the cloud provider server;

decrypting the cipher drop with the first drop key to obtain a first drop, wherein the first drop comprises unencrypted data associated with the cipher drop;

processing the first drop to obtain a second drop, wherein processing the first drop comprises one or more of copying or transporting the first drop;

comparing the first drop and the second drop to determine that the second drop is the same as the first drop following the processing of the first drop; and in response to determining that the first drop is same as the second drop, destroying the first drop and the first drop key.

18. The non-transitory computer-readable medium of claim 17, wherein the operations further comprise:

requesting a second drop key; and receiving the second drop key.

\* \* \* \* \*